United States Patent [19]

Stambolic et al.

[11] Patent Number: 5,685,776
[45] Date of Patent: Nov. 11, 1997

[54] HAND-HELD ELECTRONIC GAME DEVICES

[75] Inventors: Zarko Stambolic, Oak Park; Shari L. Smith, Chicago, both of Ill.; Frank Mercurio, Wallingford, Conn.; Howard J. Morrison, Riverwoods, Ill.

[73] Assignee: Tiger Electronics, Inc., Vernon Hills, Ill.

[21] Appl. No.: 344,329

[22] Filed: Nov. 23, 1994

[51] Int. Cl.⁶ .................................................. A63F 9/00
[52] U.S. Cl. ............................... 463/46; 463/37; 463/7
[58] Field of Search ............................. 463/46, 1, 3, 36, 463/37, 38, 7

[56] References Cited

U.S. PATENT DOCUMENTS

| | | | |
|---|---|---|---|
| 4,322,073 | 3/1982 | Slavik et al. | 463/3 |
| 4,403,777 | 9/1983 | Del Princeipe et al. | 463/1 |
| 4,969,647 | 11/1990 | Mical et al. | 463/46 |
| 5,184,830 | 2/1993 | Okada et al. | 463/46 |
| 5,207,426 | 5/1993 | Inoue et al. | 463/36 |
| 5,213,327 | 5/1993 | Kitaue | 463/38 |
| 5,217,295 | 6/1993 | Tortola et al. | 463/46 |

OTHER PUBLICATIONS

Midway Mortal Kombat product, shown on p. 84 (copyright 1992) from Jan. 1994 edition of Tiger Electronics, Inc. book entitled *Lightning Strikes Again*.

*Primary Examiner*—Jessica Harrison
*Assistant Examiner*—James Schaaf
*Attorney, Agent, or Firm*—Fitch, Even, Tabin & Flannery

[57] ABSTRACT

Hand-held electronic game devices employing push buttons and other controls to manipulate game play and action on electronic displays, e.g., Liquid Crystal Display (LCD) or Light Emitting Diode (LED) display devices. The game devices have unique elongated, tubular forms in the shape of a stick. The electronic displays are integral with the unique tubular forms and generally centrally mounted therein. Various types of controls are employed at either or both ends of the game devices including, e.g., push buttons, pull switches, spring-loaded balls, flip switches, mouse controls, pointer balls, lever arms, or the like. Game concepts and operations are utilized based upon the particular control mechanisms employed as well as the unique physical shape and appearance of the devices.

18 Claims, 15 Drawing Sheets

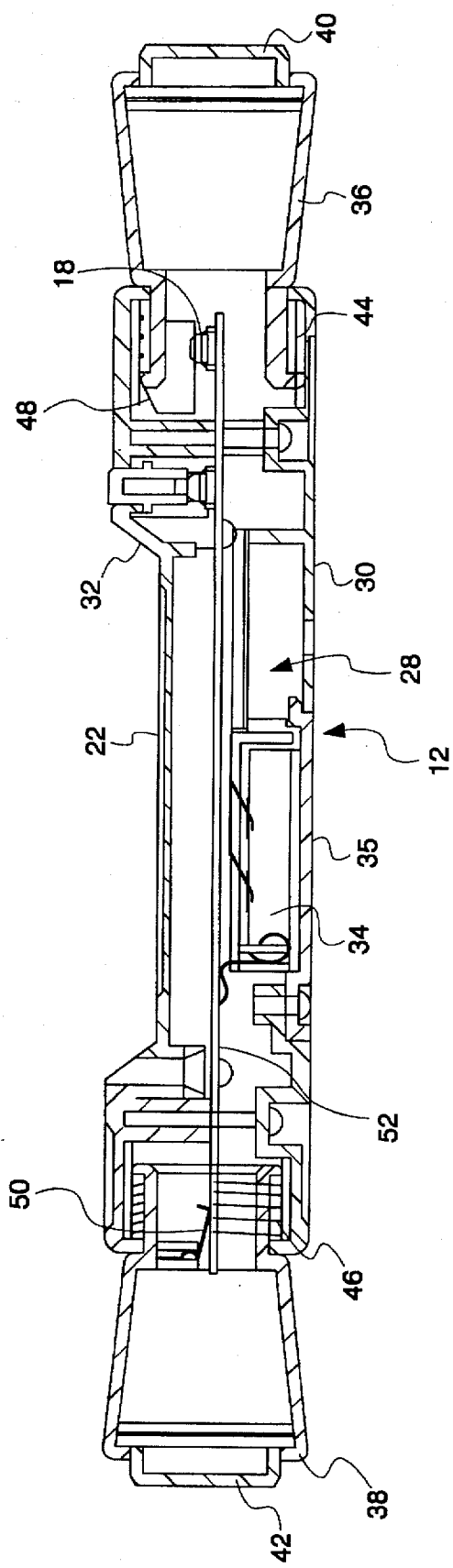
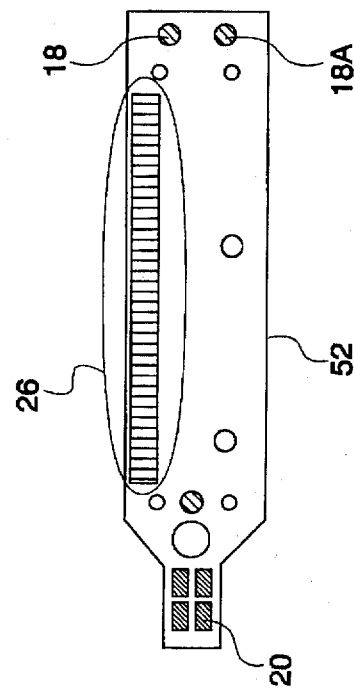
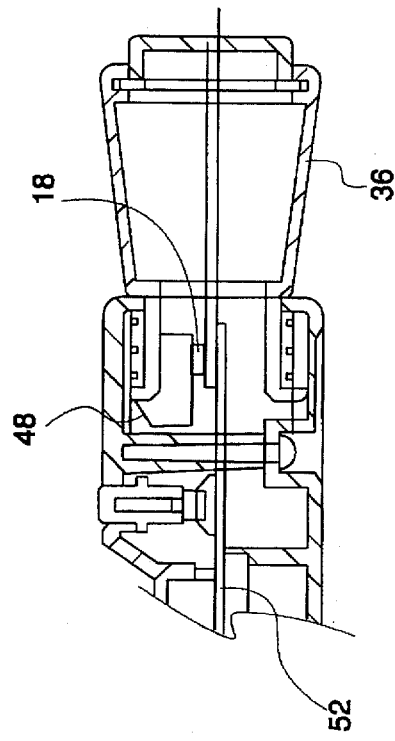
Fig. 3A
Fig. 3B
Fig. 3C

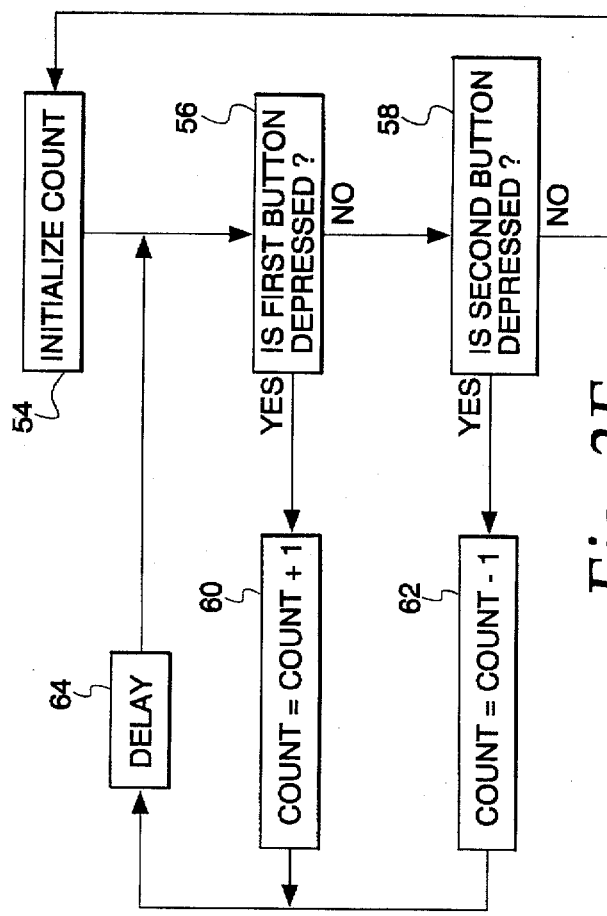
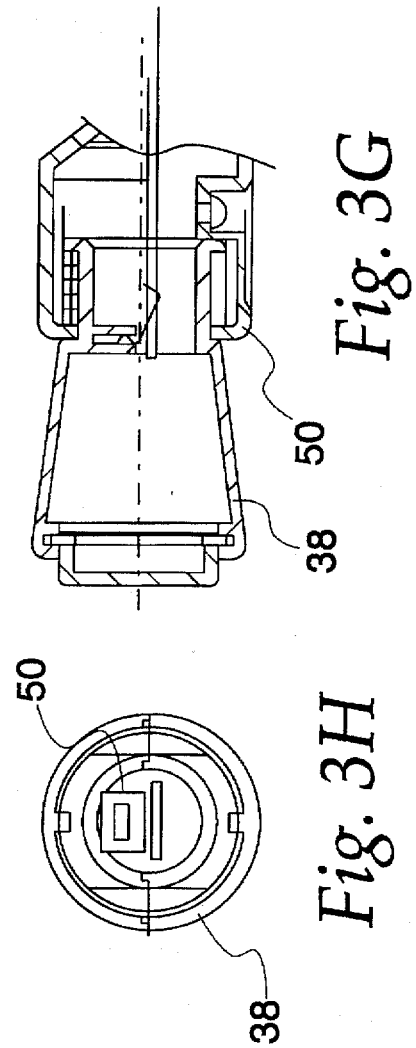
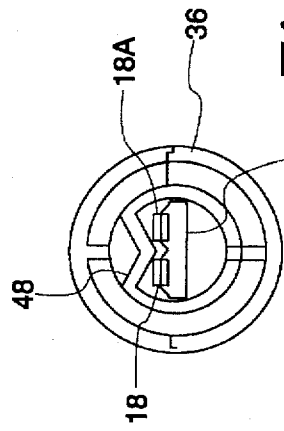
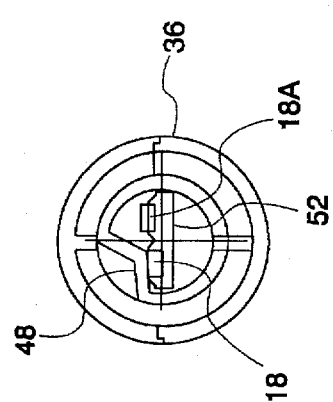

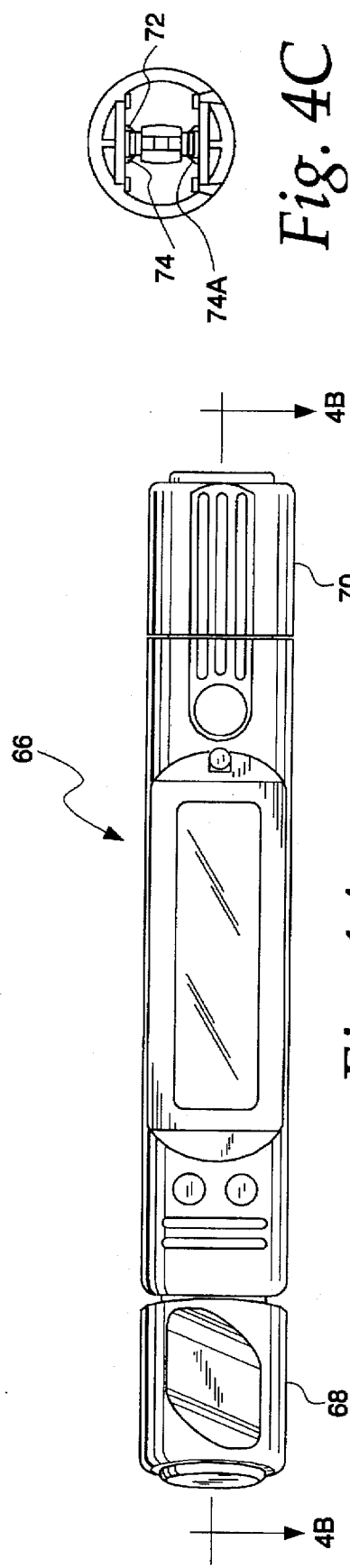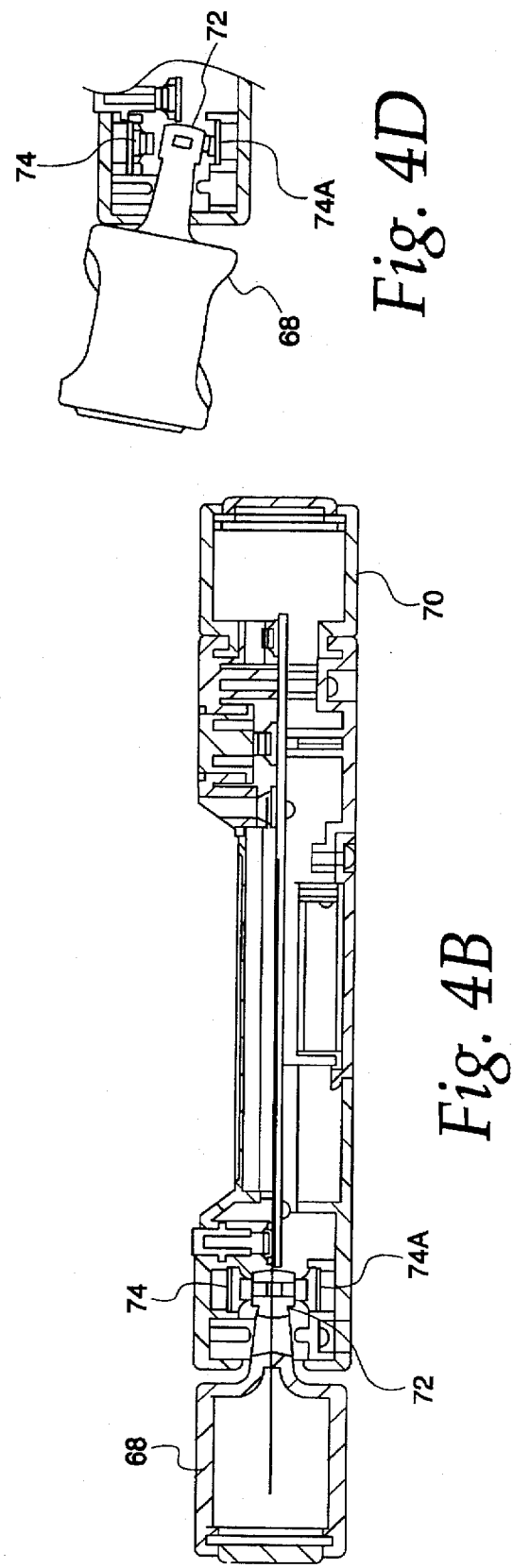

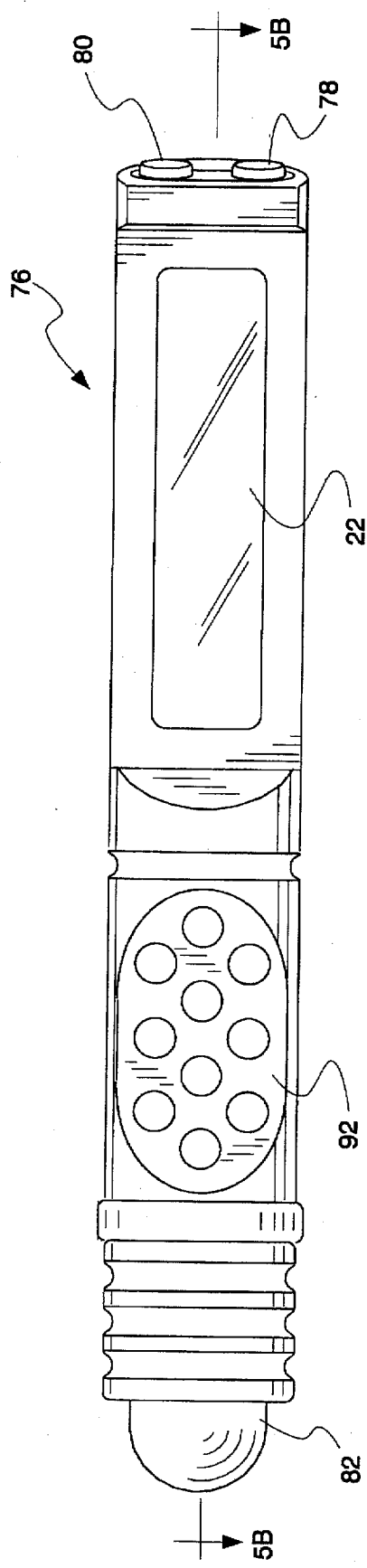
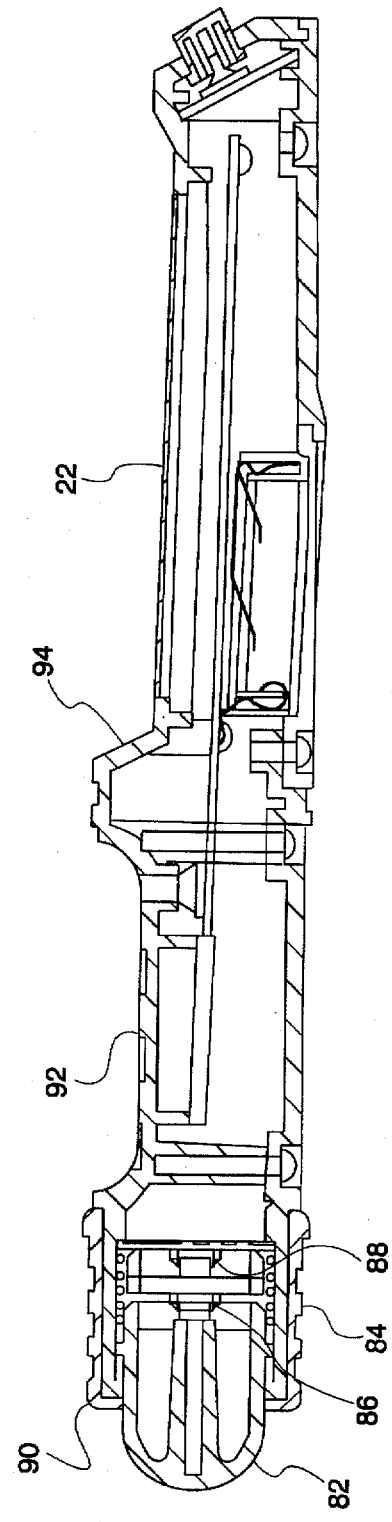
Fig. 5A
Fig. 5B

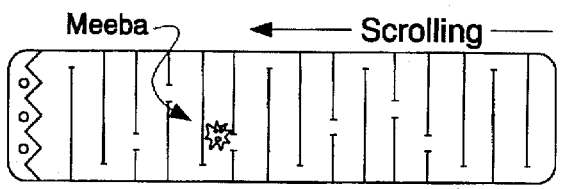

Maze is scrolling right to left. Increases speed as game progresses. Meeba must avoid getting impaled on jagged wall.

*Fig. 9A*

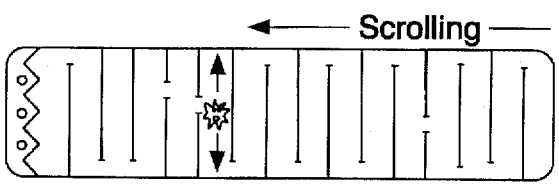

Meeba is moving through maze as round character. Moves up and down by right control.

*Fig. 9B*

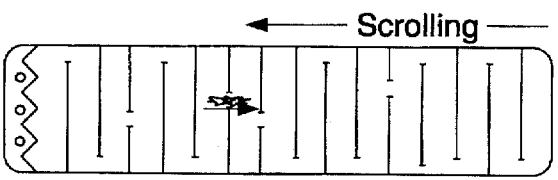

By pulling sides of game Meeba stretches out and moves to the right through narrow passage.

*Fig. 9C*

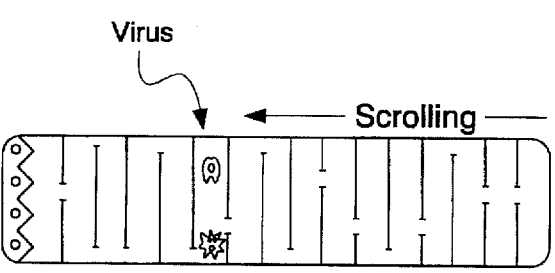

Virus appears.

*Fig. 9D*

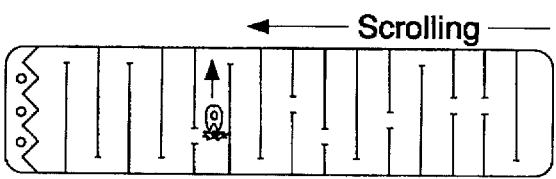

Virus must be "bounced" by pulling ends at the right time or he will devour Meeba.

*Fig. 9E*

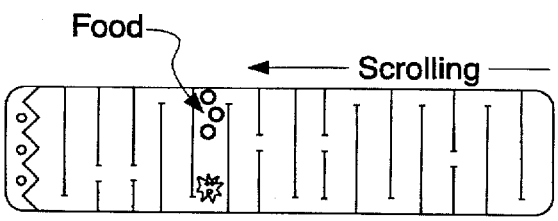

Meeba can wait in place by stretching between walls and catch doughnuts for food that drop from the top of screen.

*Fig. 9F*

SHARK moves forward by flicking right switch, and moves top or bottom position by moving left switch.

Press button to eat fish. See how many fish you can eat in 200 seconds.

Jaws Theme

Avoid hooks and garbage or SHARK gets caught.

Vooop!

SHARK gets canned.

OPTIONS:
    Smelly fish.
    Submarines.

Ring! Ring!

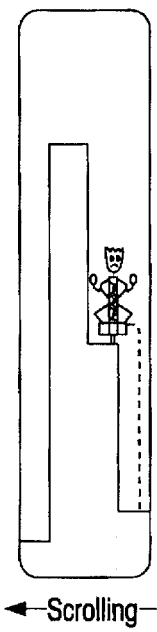

Buildings are scrolling right to left. POGO jumps over buildings and obstacles by bouncing spring button on the table.

*Fig. 11A*

←Scrolling—

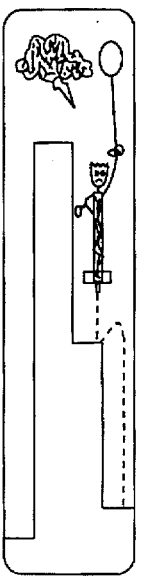

Hold button down on the table to suspend POGO. His legs straighten while he is in mid air and his arm is out to catch balloons ect. (2 points)

Avoid lightning bolt which fries POGO into skeleton.

*Fig. 11B*

←Scrolling—

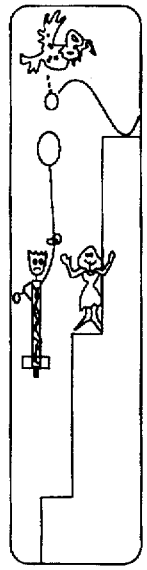

Avoid buzzards which can pop balloons or drop bombs.

Hand off escape balloon for "Faye Raye" to float away. (10 points)

Avoid smashing on "Faye Raye"

*Fig. 11C*

←Scrolling—

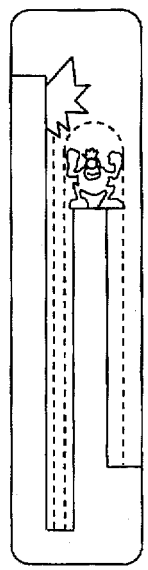

OPTIONS:
Avoid smashing into buildings.

Avoid King Kong.

Avoid window washers.

Give Balloons to babies.

*Fig. 11D*

←Scrolling—

Shapes and receivers scroll by.

When two that match are in the center space, hit the ends together to fill the plug.

(Already plugged)

Receiver changes color when plugged and turns into block.

Shapes scroll by faster and faster as the game progresses.

Try to fill all the plugs before time is up.

Motorbike is controlled by rolling up and down, but must jump over pits and obstacles by using button.

See how far you can go before getting five bandaids.

Landscape scrolls by whenever bike is moving.

Timing must be correct to avoid jumping rabbit.

Motorbike goes under jumping rabbit.

Avoid pidgeons.

Avoid Avalanche.

HAND-HELD ELECTRONIC GAME DEVICES

BACKGROUND OF THE INVENTION

1. Field of the Invention

The present invention is directed to hand-held electronic game devices. More particularly, the invention is directed to novel hand-held electronic game devices of elongated tubular form with a generally, centrally mounted electronic display and various types of controls at either end, e.g., push buttons, pull switches, spring-loaded balls, flip switches, momentary switches, slide switches, twist knobs, mouse controls, pointer balls, lever arms, or the like. Game concepts and operations are utilized based upon the unique physical shapes of the devices and the particular control mechanisms employed.

2. Description of the Related Art

Hand-held electronic games presently available today employ user controls and electronic displays housed in typically rectangular or cubic enclosures to somewhat emulate larger video arcade games. Of course, commercially available hand-held games are usually made with inexpensive electronic components and thus represent compromise approaches balancing consumer demand for well-recognized and familiar video games with the cost constraints of hand-held electronics.

What has not been recognized, however, is that hand-held games by their very nature and size might actually offer possibilities in game play and operation unique to themselves. It would be highly desirable to provide a hand-held game which advantageously offers functionality emphasizing methods of operation which actually exploit and promote the characteristics unique to hand-held devices. Unfortunately, hand-held game devices typically do not take advantage of device size and shape to provide games which are unique unto themselves.

In addition to size, the user interface of hand-held games offers flexibility and variations which are more diverse and perhaps superior to that available even in the expensive video arcade games. An unmet need therefore exists for original approaches for the concepts and the operations of hand-held games within the size and cost constraints of such devices.

SUMMARY OF THE INVENTION

It is an object of the invention to overcome the disadvantages of the prior art hand-held game devices.

It is another object of the present invention to provide unique methods of operations for hand-held game devices.

It is a further object of the invention to directly link methods of operation for electro-mechanical user interfaces unique to device shapes which effect the electronic display in game play of hand-held games.

It is yet another object of the invention to provide an elongated tubular body of stick-shaped enclosure advantageously suited to methods of operation for hand-held game devices.

It is another object of the invention to provide unique user controls for a novel hand-held game device using inexpensive switches.

The present invention provides elongated stick-like hand-held game devices having unique methods of operation. Employing an elongated tubular housing enclosure for a hand-held game in the shape of a stick having controls suited to the stick shape, promotes methods of operation unique to the hand-held game device. As such, the present invention takes advantage of device shape and size by employing unique user controls to achieve a hand-held game particularly suited for linking novel methods of operation to game play. The invention thereby provides original approaches for the concepts and the operations of hand-held games.

Briefly, the present invention relates hand-held game devices employing push buttons and other controls to manipulate game play action on electronic displays, e.g., Liquid Crystal Display (LCD) or Light Emitting Diode (LED) display devices. The game devices have unique elongated tubular forms in the shape of a stick body. The electronic displays are integral with the unique tubular forms and generally centrally mounted therein. Various types of controls are employed at either or both ends of the game devices including, e.g., push buttons, pull switches, spring-loaded balls, flip switches, momentary switches, slide switches, twist knobs, mouse controls, pointer balls, lever arms, or the like. Game concepts and operations are utilized based upon the particular control mechanisms employed as well as the unique physical shape and appearance of the hand-held game devices.

The hand-held game devices can be embodied in electronic circuitry that is compact, reliable and relatively inexpensive to manufacture. The invention itself together with the objects and attended advantages will be best understood by reference to the following descriptions taken in connection with the accompanying drawings. Additional objects and advantages of the invention will become apparent from the description which follows and may be learned by practice of the invention. The objects and advantages of the invention will be realized and attained by means of the elements and combinations particularly pointed out in the appended claims. It is understood therefore that both the foregoing general and following detailed descriptions are exemplary only and not restrictive of the invention as claimed.

BRIEF DESCRIPTION OF THE DRAWINGS

FIGS. 3A through 3K illustrate the construction and the operation of the hand-held electronic game device of FIG. 1 in detail;

FIGS. 4A through 4D illustrate an alternative embodiment of a hand-held electronic game device in accordance with the present invention;

FIGS. 5A and 5B illustrate another alternative embodiment of a hand-held electronic game device in accordance with the present invention;

FIGS. 9A through 9F illustrate electronic display game play screens for the hand-held electronic game embodiment of FIG. 1;

FIGS. 11A through 11D illustrate electronic display game play screens for the alternative embodiment of FIG. 5A;

DETAILED DESCRIPTION OF THE PREFERRED EMBODIMENTS

Figure 1:
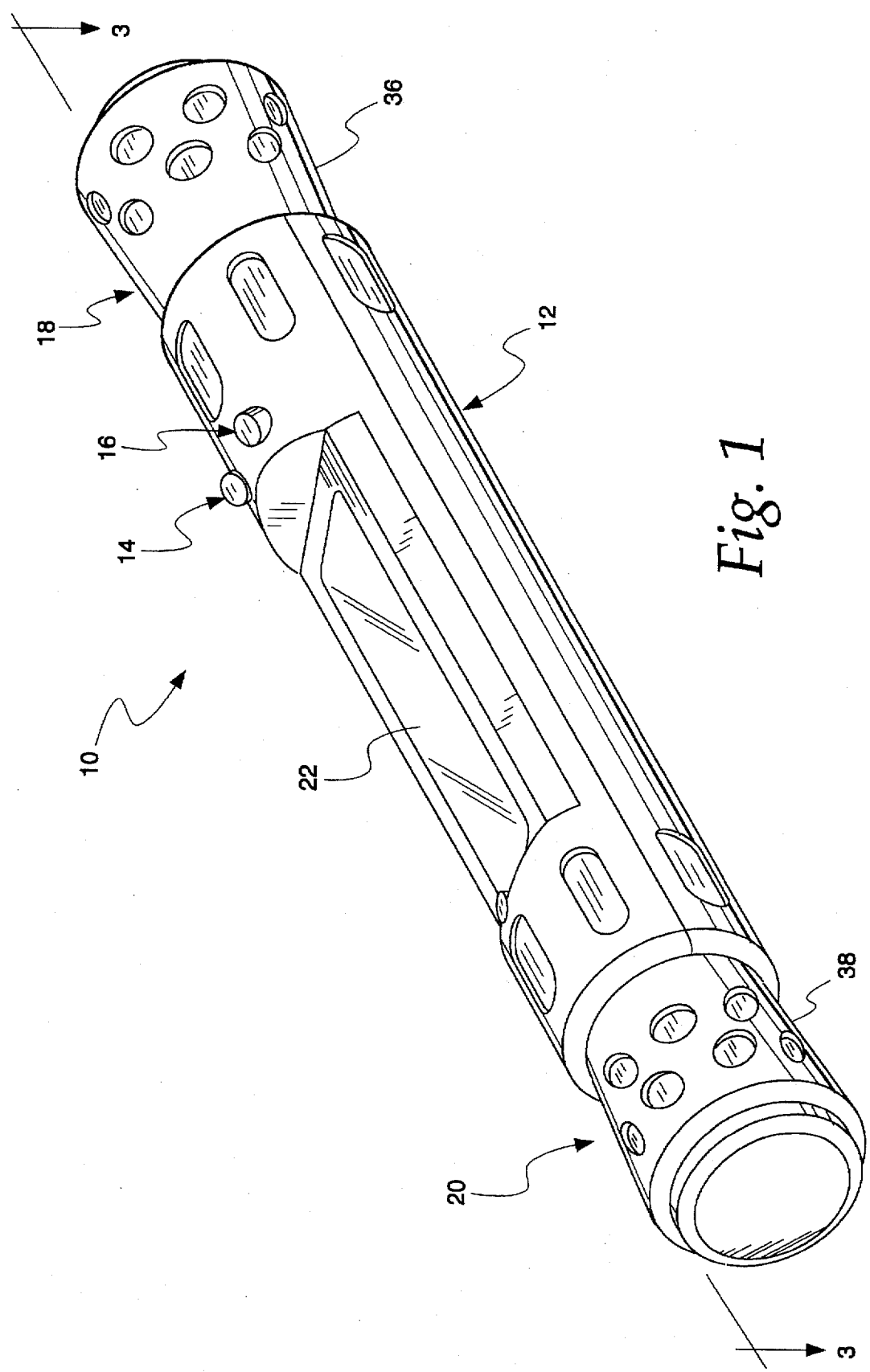
FIG. 1 is a perspective view of a hand-held electronic game device in accordance with the present invention.

As depicted in FIG. 1, a hand-held electronic game device 10 having a body which includes an elongated, tubular housing enclosure 12. Multiple control switches 14, 16, 18, and 20 are provided as user input and an electronic display 22 for visual output for game play. The control switches 18 and 20 are illustrated generally and are respectively controlled by knobs 36 and 38 as discussed in connection with FIG. 3A below.

The hand-held electronic game device of FIG. 1 illustrates one of several preferred embodiments of the invention. Hand-held electronic game devices 10 of the type shown in FIG. 1 provide elongated, stick-like, hand-held electronic games having unique methods of operation and control suited to the stick-shape to take advantage of original approaches for the concepts and the operations of such games.

The games discussed herein are intended to be marketed under the name "FLIX STIX", representing a line of hand-held electronic game products including the several embodiments discussed as well as the operational concepts employed. The games discussed herein are referred to as LCD games because electronic displays are provided as a visual output means much as the video screens of video games.

FLIX STIX, as should be appreciated from the foregoing discussion and the detailed discussion which follows, are unique games having electronic display devices such as LCD displays wherein each game has a unique method of operation, which method of operation directly links electromechanical operations to the effect of the LCD screen and game play area. Various members at the ends of the FLIX STIX allow user manipulation as a means of game play. Additionally, the FLIX STIX provide sound effects linked to game play.

Figure 2A:
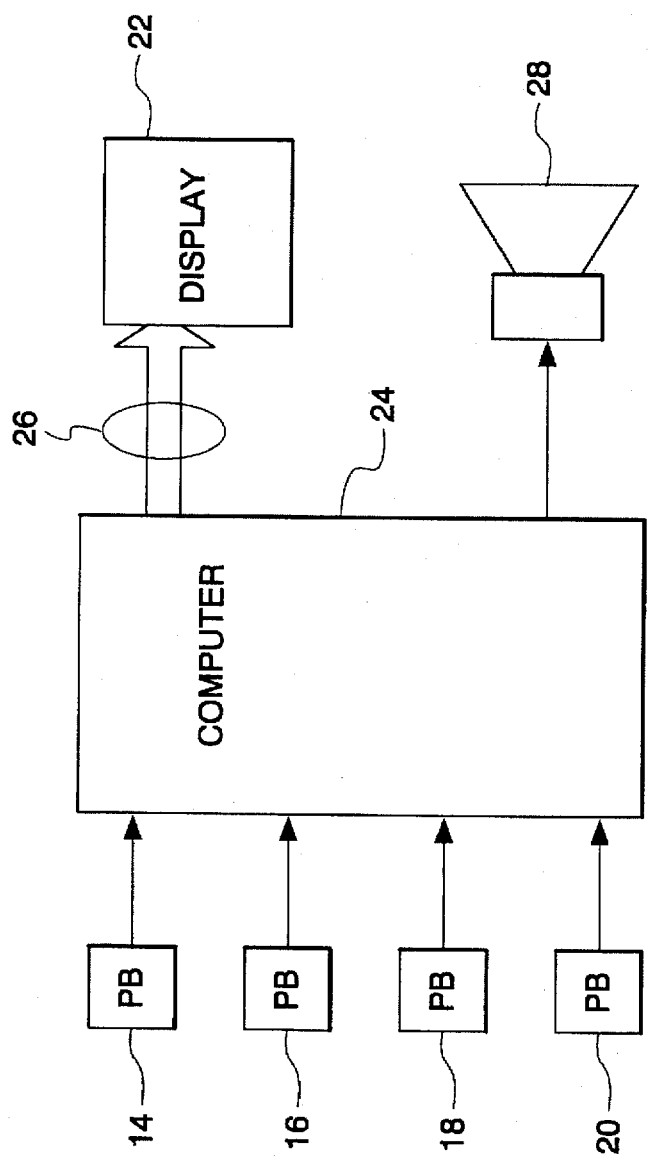
FIG. 2A is a schematic block diagram corresponding the device of FIG. 1.

Referring now to FIG. 2A, the FLIX STIX embodiment utilize momentary push buttons (PB) as control switches 14, 16, 18, and 20 as user input to a computer or microprocessor 24. The control switches 14, 16, 18, and 20 are designed to be activated by momentary conductive rubber membranes and the like which are customary switches utilized for low cost consumer applications. Such switches provide an advantageous basic mechanical construction, which, as will be discussed further below, are newly adapted such that switching via novel user interfaces are provided not only as push-type buttons, but also as rotary switches and toggle switches which have been designed to utilize the conductive rubber pads of such momentary conductive rubber membrane switches.

It should be appreciated that the multiple and flexible user interfaces to FLIX STIX discussed include various members as FLIX STIX and providing a wide variety of input means including push buttons, pull switches, spring-loaded balls, flip switches, momentary switches, light switches, twist knobs, mouse controls, pointer balls, lever arms, or the like. All such user interfaces provided for the FLIX STIX while taking advantage of quite complex actions or activities on the part of the game player, are provided and sometimes simulated using inexpensive switching mechanisms with the various control members employed. The switches 14, 16, 18 and 20 upon being manipulated by the user via the user interface members are then utilized as inputs to the computer 24. The computer 24 provides output to an electronic display bus 26 which is connected to an electronic display 22 on the FLIX STIX. A speaker 28 is provided within each FLIX STIX and the speaker 28 is driven from the computer 24 based upon the user input via switches 14, 16, 18, and 20 as well as the game play progression. The speaker 28 is typically a widely available 20 mm piezo speaker which may be utilized to provide a wide variety of sound effects in conjunction with being played.

Figure 2B:
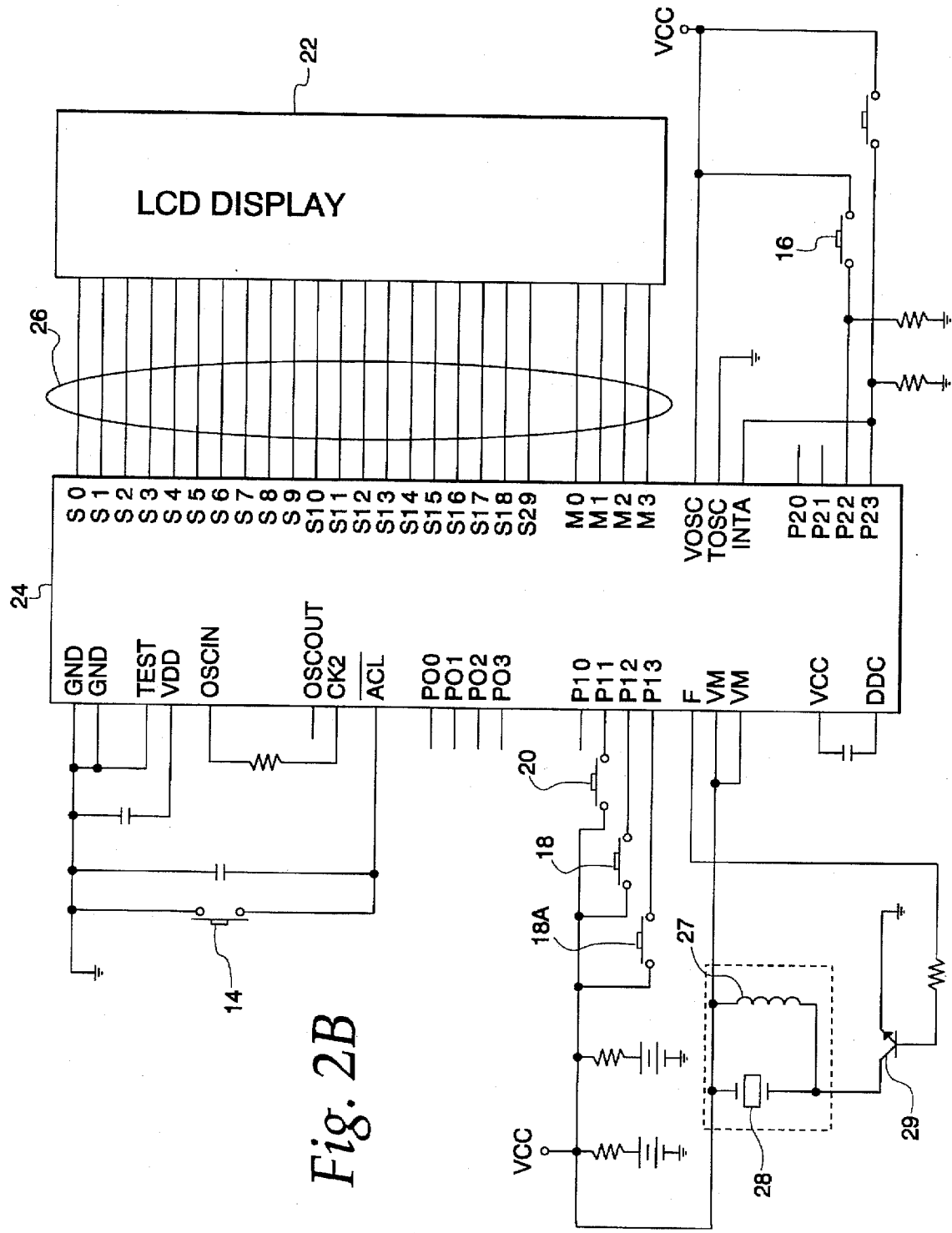
FIG. 2B is a detailed electronic schematic diagram therefor.

FIG. 2B is a detailed electronic schematic diagram relating to the block diagram of FIG. 2A. The computer 24 is provided as a microcomputer herein from the SM5 family of single-chip, four-bit microcomputers available from Sharp Corporation, Japan, specifically the SM5LO microcomputer. The electronic schematic of FIG. 2B is intended for use with the embodiment of FIG. 1, which as discussed below relates to a game called "MEEBA" wherein switch 18 is provided as two switches 18 and 18A providing up and down functions respectively in connection with twisting movements of the knob 36. The switch 20 provides stretching of the character associated with the MEEBA game by pulling the knob 38 to trigger the switch 20. The up, down and stretch functions provided by switches, 18, 18A, and 20 respectively effect game play and the visual output to the LCD display 22 via the display bus 26 from the computer 24. It should be appreciated that any number of additional switches may be utilized as input to the computer 24. The piezo buzzer or speaker is provided with a buzzer inductor 27 typically 30 to 50 millihenries under the control of the computer 24 via a switching transistor 29 typically a 9014C or equivalent.

Figure 3K:
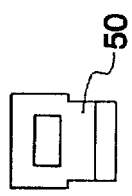

FIGS. 3A–3K illustrate the details of the construction and operation of the embodiment of FIG. 1, FIG. 3A showing the cross section thereof. An intermediate housing body 30 is provided with a recessed area 32 for the display 22. The intermediate body 30 provides a battery housing chamber 34 enclosed by a battery housing cover 35 within the body 30.

As discussed, the ends of the FLIX STIX are provided with user interface members herein the knob 36 which switches the switch 18 based upon a twisting action and knob 38 which provides a pull switch mechanism. Push button ends are provided as push button 40 associated with the knob 36 and a push button 42 associated with the knob 38. The knob 36 may be pulled as well as twisted and is supported by a spring 44. A spring 46 is also provided with the knob 38 to facilitate the pull switch function of the knob 38.

The knob 36 performs switching of the switch 18 via rotation of the knob 36 which in the hollow interior portions thereof includes a laterally extending protrusion 48 which at the extremes of rotation of the knob 36 is run into contact with the switch 18 for closure thereof. The knob 38 is provided with wiping contacts 50 interior thereto which make electrical contact at the surface of a printed circuit board (PCB) 52. Thus as the knob 38 is extended and returned to position, the wiping contact 50 is moved inward and outward along the surface of the PCB 52 to make and break electrical switch contacts thereon.

FIG. 3B illustrates the PCB 52 showing the contact strips for the display bus 26 and the switches 18, 18A, and 20 wherein switches 18 and 18A are positioned in complementary positions allowing switching at opposite extremes of rotation of the knob 36. The switch 20 is implemented by providing the standard PCB laminated electrical contact pads shown in FIG. 3B which may be brought into electrical contact with the wiping contact 50 to make and break electrical connections therebetween.

FIGS. 3C, 3D and 3E illustrate the twisting action of the knob 36 to switches 18 and 18A at opposite extremes of rotation wherein the knob 36 may move 60° in either direction from the center of rotation providing a 120° arc of rotation. FIG. 3 is an expanded cross section of FIG. 3A. FIG. 3D and FIG. 3E illustrate cross sectional end views wherein FIG. 3D illustrates the knob 36 at its mid/resting point and FIG. 3E illustrates the knob 36 twisted to the extreme wherein switch 18 is depressed.

FIG. 3F illustrates a program flow chart corresponding to software for use with input from the knob 36 having the design illustrated in FIGS. 3C, 3D, and 3E. Program flow starts in an initialized count 54 where a counter may be set in software to an initial value from which a determination of time during which the knob 36 is rotated to either extreme so as to depress the switches 18 and 18A. Box 56 determines whether the first button is depressed herein the switch 18. If the knob 36 is not twisted but at its mid/resting point, the program flow exits box 56 with a "No" and enters box 58 which determines whether the second button is depressed herein switch 18A. If 18A is not depressed, the loop closes and the program returns to initialized count. If, however, the first button is depressed, the program flow exits box 56 to enter box 60 wherein the count is incremented and returns via the delay 64 to a predetermined time period during the measurement of time at which the switches 18 or 18A may be depressed. If at the extreme depressing switch 18A program flow exits box 56 and enters box 15A, a yes output brings program flow to box 62 to decrement the count and then subsequently returns the program flow via the delay 64 to interrogate the switches once again.

FIGS. 3G and 3H are cross-sectional views of the knob 38 which utilizes the wiping contact 50 as shown. Depending on the placement of contact pads upon the laminated surface of the printed circuit board 52, the wiping contact 50 may be utilized to make or break electrical contacts on the PCB 52. A program flow similar to that described for the knob 36 in FIG. 3F may be similarly utilized to determine the amount of time which the knob 38 is positioned at an extended or nonextended position. It should be appreciated that several contact pads may be utilized on the PCB 52 to extend the wiping contact 50 over numerous pads making and breaking electrical contacts as the knob 38 is proceeded. A suitable program flow for several switches would thus be utilized for determining the times at which various extensions of the knob 38 are occurring.

Figure 3J:
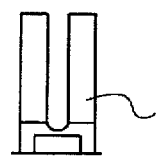
Figure 3I:
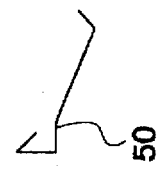

FIGS. 3I, 3J, and 3K illustrate the wiping contact 50 in detail wherein FIG. 3I provides a side elevational view, FIG. 3J provides a top plan view, and FIG. 3K provides an end view of the wiping contact 50. The wiping contact 50 is made from a suitable metallic conductive material which is illustrated in FIG. 3I will provide a downward force pressing the wiping contact onto the printed circuit board 52. The top plan view of FIG. 3J illustrates two extensions of the wiping contact 50 which may pass along printed circuit board contacts to make electrical connections therebetween.

Referring now to FIG. 4A, an alternative embodiment of a hand-held electronic game device is illustrated generally by reference numeral 66. At the ends of the alternative embodiment of FIG. 4A are provided numbers for use as user input, mainly a flip switch 68 and a rotating switch 70. The flip switch 68 provides forward and backward movement of the flip switch 68 inward and outward from the page as depicted in FIG. 4A. The rotating switch 70 is provided similar to the knob 36 as embodied in FIGS. 3C, 3D, and 3E, wherein switch contacts may be made at extremes of rotation of the rotating switch 70.

FIG. 4B illustrates the alternative embodiment of FIG. 4E, a cross section showing momentary switches 74 and 74A activated by movement of the flip switch 68. In particular, the flip switch 68 is mounted with an extending arm 62 which maintains contact with the switches 74 and 74A such that movement thereof from either extreme closes one of the switches 74 and 74A. FIG. 4C illustrates the flip switch 68 at an extreme movement so as to depress switch 74A with the extending arm 72. FIG. 4D shows a cross-sectional end view wherein the extending arm 72 is positioned between the switches 74 and 74A.

FIG. 5A illustrates yet another embodiment of a FLIX STIX hand-held electronic game device generally depicted by a reference numeral 76. This alternative embodiment 76 provides a unique game play in that the game is intended for a vertical orientation of the FLIX STIX such that the display 22 is positioned in a relative sideways fashion. Also of interest is that the display 22 while still disposed between controls at either end of the FLIX STIX, namely push buttons 78 and 80 and spring-loaded ball 82 at opposite ends of the FLIX STIX. The display nonetheless is positioned somewhat nearer to one end than the other, though generally centrally located. As discussed further in the Examples below, the embodiment indicated by reference numeral 76 is held vertically in one of a player's hands such that the hand wraps around the intermediate portion of the game with the player's thumb positioned to depress push button 78 or 80 and the player being able to depress the spring-loaded ball member 82 by forcing the hand-held electronic game device itself against a table top or like flat surface. The fingers of the player's hands may wrap around the embodiment 76 and rest within a depressed area 92 on the body of the game.

FIG. 5B illustrates a cross-sectional view of the alternative embodiment 76 of FIG. 5A. Herein the LCD display 22 is positioned within a depressed area 94 and the depressed area 92 is illustrated for placement of a player's fingers. Note particularly the spring-loaded ball member 82 wherein a spring 84 positions the member 82 and forces the member 82 outward from the device which secures the spring-loaded ball mechanism assembly at reference numeral 90. As drawn, extended and retracted switch positions 86 and 88 of an inner push button switch illustrate a released position and a position in contact with the member 82 such that extensions of the member 82 within the game device by downward force with the player's hand will depress the push button switch to switch positions 86 and 88. Switch positions 86 and 88 used by the computer 22 much as in the first embodiment to provide user input via the spring-loaded ball member 82.

Figure 6:
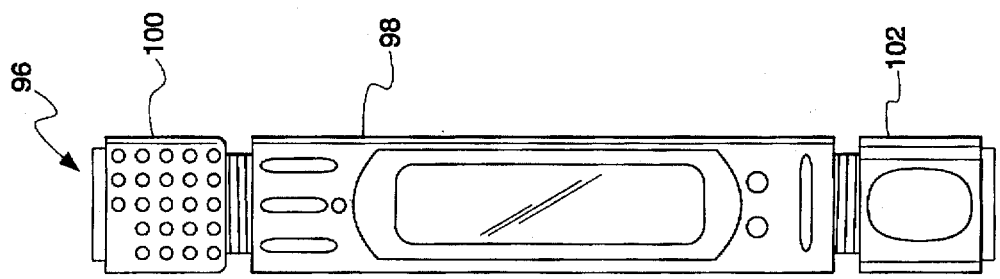
FIG. 6 illustrates another alternative embodiment of a hand-held electronic game device in accordance with the present invention.

FIG. 6 illustrates an additional embodiment of a hand-held electronic game device wherein the game is intended for use in a horizontal orientation such that a handle 100 and a handle 102 are provided at the ends thereof to twist and push inward and outward from the intermediate body portion 98. Accordingly, the embodiment 96 is intended for use by both hands of a user such that one hand grips handle 100 and the other hand grips handle 102, and the handles 100 and 102 respectively are manipulated by the user's hands to effect game play of the embodiment 96.

Figure 7:
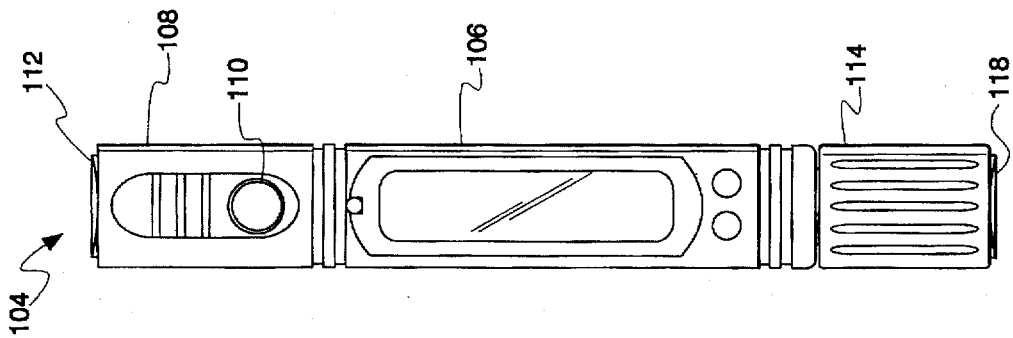
FIG. 7 illustrates another alternative embodiment of a hand-held electronic game device in accordance with the present invention.

An additional embodiment 104 is illustrated in FIG. 7 which provides a stationary end portion 108 having push button 110 at the side thereof and push button 112 at the end thereof for user input. The embodiment 104 has an intermediate portion 106 which is in this case integral with the end portion 108. A rotating knob 114 is provided similar to knobs 70 and 36 discussed above in alternative embodiments. In addition to the twisting motion of knob 114, a push button 118 provides additional input for game play of the embodiment 104.

Figure 8:
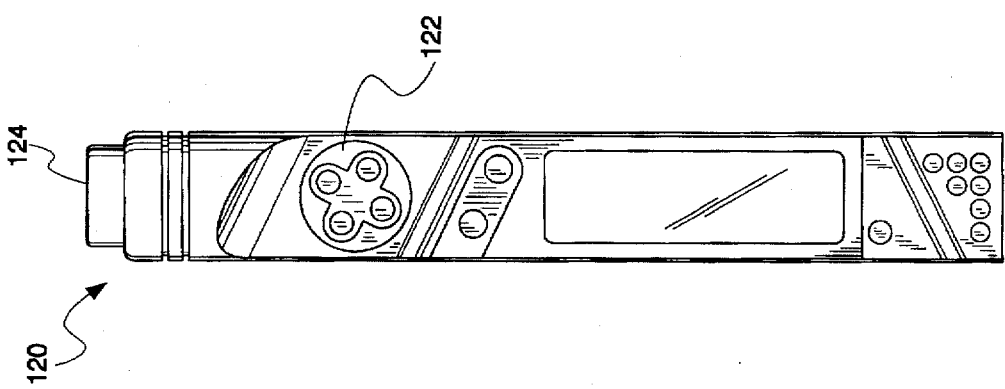
FIG. 8 illustrates another alternative embodiment of a hand-held electronic game device in accordance with the present invention.

FIG. 8 illustrates an additional embodiment 120 wherein a four-way directional pad 122 is provided for user input of information in four directions based upon the depression of specific ends of the four-way directional pad 122. A push button at the end of the embodiment 120 is provided as push button 124 for user input.

The various embodiments illustrated herein are exemplary and discussed in further detail in the Examples which follow to provide additional descriptions of the embodiments of hand-held electronic game devices. The following Examples are exemplary and not limiting of the FLIX STIX game concepts.

EXAMPLE 1

"MEEBA"

Game Summary and Gameplay:

MEEBA is a FLIX STIX LCD game as illustrated in FIG. 1 for use in a horizontal orientation wherein both ends stretch and one end twists. MEEBA is a little "0" shaped character that goes through a maze by stretching out and slipping through holes while eating things and avoiding viruses. The LCD graphic for this game is illustrated in FIGS. 9A–9F.

Game Story:

This is the story of MEEBA, a happy little single-celled organism. MEEBA's day started out simple enough (as all days do when you're an amoeba), just swimming and eating followed by more swimming and eating. Unfortunately, it looks like MEEBA picked the wrong pool of plasma to go for a dip in today. There's something strange about the way the cell walls are moving, and there's some kind of mutant virus running around out of control in here. It's a good thing he's an amoeba, since he's got the ability to stretch his "body" in really tight situations! Can you help MEEBA get through this mess in one piece?

Method of Switching Operations and Motion Control:
1. Pull switch stretches the character;
2. Pull/rotating switch when rotated, steers the character; and when pulled, stretches the character.

The object of the game is to complete all stages of the game, and achieve as high a score as possible. The game takes place inside a maze of walls. The walls will quickly scroll across the display, coming at the player. There will be small openings that the player/character (as MEEBA) will need to move through. This will be done with the use of MEEBA's stretching ability, which allows him to thin himself out and squeeze through "holes" or gaps in the maze. Preventing MEEBA from getting through the maze are MUTANT VIRUSES, which will attack and cling to MEEBA, attempting to slow him down and eat him. The viruses will attack from above and below MEEBA. If he is attacked, MEEBA has a brief chance to "bounce" the virus away by quickly stretching out his body. If he can't do this in time, he will lose one life. There are also items of food that MEEBA can grab for points. This food will be seen as "chicken drumsticks", and they will fall from the top of the screen. MEEBA can wait in place by stretching to grab this food for points. MEEBA grabs food simply by moving right next to it. If you are eaten by a virus, or hit one of the cell walls, you lose one life. If you lose all of your lives before completing all stages, the game is over. If you score a certain amount of points, you will be awarded an "extra" MEEBA. The various stages will essentially be the same, but will become progressively more difficult. This difficulty will involve more attacking viruses, and a maze that scrolls faster towards the player. As the games progresses, each level will become more difficult. The mazes will scroll faster, and there will be more Mutant Viruses to avoid or bounce. This means that the maze starts out scrolling quickly towards the player (MEEBA), and gradually speeds up after each stage. In later stages, the maze should move VERY FAST. If you complete all stages of the game before you run out of MEEBAs, you win!

Control Summary:

As will all "FLIX STIX" games, the controls are specific to the unit/game. The MEEBA unit is a horizontal unit. Both ends of the unit "pull out", or stretch, and one end (the left side) twists. These controls will cause the on-screen character to perform its particular actions. When both sides are stretched out at the same time, MEEBA will "stretch" his body out horizontally, become thin and flat. This will enable him (it) to squeeze through narrow passages/openings in the maze as they scroll towards him/it. This action will also cause MEEBA to "bounce" enemy viruses that attack and try to eat him. When MEEBA stretches out while a virus is attached to him, the virus will be knocked off into a wall. MEEBA will often need to move up or down in order to move towards openings in the maze, or to grab "chicken drumsticks" as they fall from the top of the screen.

EXAMPLE 2

"SHARK"

Figure 10A:
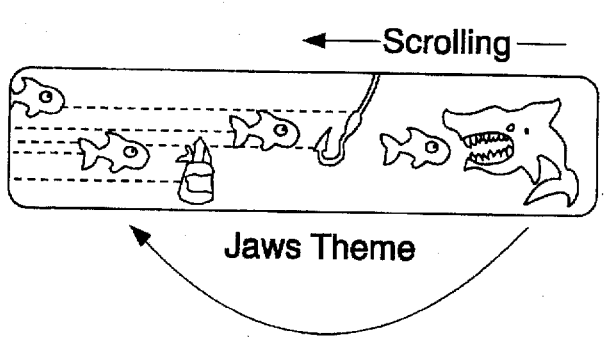
FIGS. 10A through 10C illustrate electronic display game play screens for the alternative embodiment of FIG. 4A.
Figure 10B:
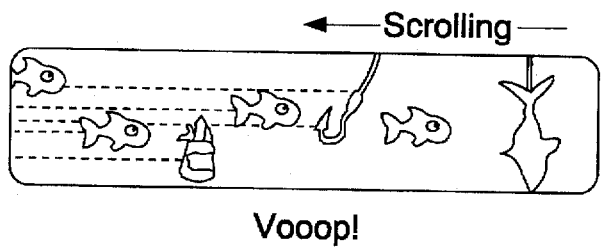
Figure 10C:
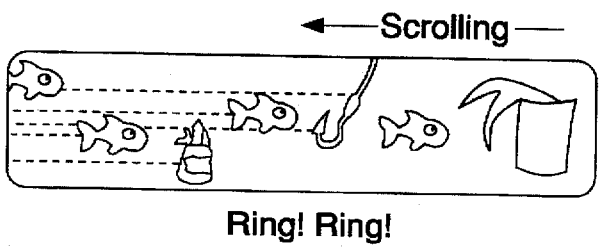

Game Summary and Gameplay:

SHARK is a FLIX STIX LCD game as illustrated in FIG. 4A, having a flip switch with front-back motions on one end and a rotating switch having a turning motion and a push button on the horizontal axis on the other end of the game. The motions of a shark character is controlled by the switches. The LCD graphic for this game is illustrated in FIGS. 10A–10C.

Game Story:

It's not easy being a "bloodthirsty eating machine". Just ask the Great White Shark. All day long, he needs to keep swimming and feeding just to stay alive. This would be tough enough, but he also has to deal with crazy scuba divers and giant fish hooks. Its enough to make a killer shark lose his appetite You will play as the SHARK. The goal of the game is to eat as many fish as possible in the time limit. There are obstacles getting in the way of your goal. Scuba divers will try to shoot you with their spear guns, and giant fish hooks will flat down from the top of the screen to try to catch you.

Method of Switching Operations and Motion Control:
1. Flip switch moves shark across the LCD display screen;
2. Rotating switch moves shark upward and downward;
3. Push button switch causes shark to eat.

The shark will be located on one side of the screen, and fish and scuba men will scroll towards him. You can make the screen scroll faster towards you (simulating swimming) by flicking the flip switch on the side of the unit. This resembles the actions of a shark's tail as it swims through the water. To move the shark up and down on the screen, twist the up/down switch on the other side of the unit. There is a button located on the side of the unit which when pressed, will cause the shark to open its jaws to eat (fish).

Getting caught on a fish hook, or speared by a scuba man will lose one life. If you lose all of your lives before completing all the stages, the game is over. Each stage is similar, but will become progressively more difficult (more scuba men who shoot spear guns faster, faster moving fish, more fish hooks). The goal of the game is not so much completing all stages, as it is "how many fish can you eat?" Eating fish gives you points. The fish are trying to swim away from the SHARK, and so will face towards the right. Scuba men will swim at the SHARK, and so will face towards the left.

EXAMPLE 3

"POGO-MAN"

Game Summary and Gameplay:

POGO-MAN is a FLIX STIX LCD game as illustrated in FIG. 5A. POGO-MAN is a vertical game having a spring loaded button/ball function. POGO-MAN jumps over buildings by pressing spring bottom on a tabletop or like surface. Buildings scroll across the screen. Holding down the spring-loaded button suspends the character in air. The LCD graphic for this game is illustrated in FIGS. 11A–11D.

Game Story:

The peaceful city of SPRING-FIELD is being threatened by a horrible menace. It seems that a flock of killer buzzards has arrived in town, and is threatening the population by dropping their enormous eggs over the city. The problem is that no one is able to reach the buzzards, since they are flying at such a high altitude! There is only one man who stands a chance . . . POGO-MAN.

The goal of the game is to catch the BUZZARDS through all STAGES of gameplay. As POGO-MAN, you will need to use your POGO STICK to climb the scrolling buildings to reach the buzzards. You will have to watch out for obstacles like EGGS dropped by the buzzards and LIGHTNING BOLTS from storm clouds. If you bounce on top of a buzzards, you will catch it. The only way to bounce on top of the buzzards is to use your POGO STICK to scale the buildings.

The POGO STICK works in the following manner. The player jumps by holding the unit down (pressing the spring-loaded ball against a surface). When the unit is lifted up, the on-screen character stretches out his body and jumps. The height of the jump depends upon how long the unit was pressed down. So for a super high jump, the player will hold the unit with the push ball pressed down for a longer period of time than for a normal jump. Each stage will feature the same obstacles and enemies. The difficulty will involve the building. As the game progresses, the buildings will be taller and will scroll faster and faster. This will make it more difficult for POGO-MAN to reach the Buzzards.

Control Summary:

As will all "FLIX STIX" games, the controls are specific to the game. The game consists of a "push ball" which will control the jumping functions of POGO-MAN. When the unit is pressed down against a surface and then lifted, POGO-MAN performs a jump. The longer the push ball is pressed down, the higher the jump. This is the only "control" function on the unit. Since the screen scrolls towards the player, there is no need for a "right/left" function.

EXAMPLE 4

"PLUGGER"

Figure 12A:
FIGS. 12A through 12C illustrate electronic display game play screens for the alternative embodiment of FIG. 6.
Figure 12B:
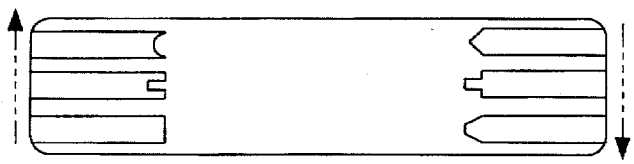
Figure 12C:
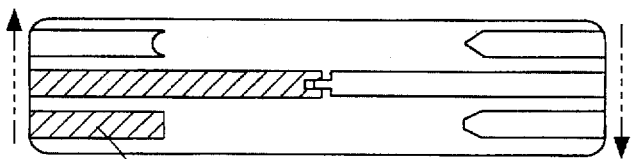

Game Summary and Gameplay:

PLUGGER is a FLIX STIX LCD game as illustrated in FIG. 6, wherein shapes and receivers therefor scroll across the screen such that matches are made when two shapes meet in the center area of the display and hit ends to ends to plug together. The ends of the game twist and push inward. The LCD graphic for this game is illustrated in FIGS. 12A–12C. This is a fast-paced puzzle game involving pattern recognition and quick reflexes.

Game Story:

Shapes will scroll by on both sides of the screen. The goal of the game is to fit all of the shapes together by "plugging" them with the button/knobs on either end of the unit. These two button/knobs push in, and will cause the shapes that are at the mid-point (vertically) to be pushed in to the middle of the screen. The gameplay will take place on a horizontal screen. Shapes will scroll by on both sides of the screen. On the right side of the screen, shapes will scroll downward, while on the left side of the screen, shapes will scroll upwards. Certain shapes will appear to fit together. The object of the game is to locate the shapes that look like they fit, and slide them together. When all shapes have been matched with another shape, the level is complete, and the player will move onto the next level. The shapes (pieces) are manipulated and fit together by turning and pushing in the "twist knobs" on each end of the horizontal unit. The player receives points every time they fit two pieces together. Also, when pieces are fit together, they disappear from the screen. If pieces are brought together, but do not fit, there will be a BEEP, and the pieces will move back to their positions on the side of the screen. When all pieces on the screen have been matched up, the level is over, and the player moves on to the next level.

Method of Switching Operations and Motion Control:

1. The "PLUGGER" game is a horizontal unit with a twist knob/button on each end of the unit. Twisting the knobs will allow the player to line up pieces as they scroll up and down on the screen. When the player feels they have made a match, they will push the knobs in to "PLUG" the two shapes together;

2. Push rotating switches at the ends of the game cause the shapes moving from opposite sides of the display to move toward each other. When rotated, the shapes are steered up or down;

3. When pushed in, BUTTONS on either end of the unit will cause shapes on-screen to slide to the middle of the screen. If there is a match, the two shapes will fit together, and then disappear from the screen.

As the player plays through a level, he/she will notice the scrolling speeding up gradually. Over time, while the player is attempting to match up shapes, both sides will scroll at increasingly faster speeds. This will make it more difficult for player to "plug" up shapes, so the incentive to do it quickly is greater (in fact, there should be a "beep, beep, beep" sound effect that increases in speed as the scrolling speed increases).

The player is allowed to make a determined number of mistakes, or non-matches. If they attempt to plug up pieces that don't match, that is a non-match. After the last (maximum allowed) non-match is made, the game is over. There are several levels in the entire game. The differences between the levels will be an increasingly fast scrolling speed as the level begins. So, while LEVEL 1 may begin fairly slowly, a later level N will be very fast, and will require greater skill to complete.

EXAMPLE 5

"MOTOBIKE"

Figure 13A:
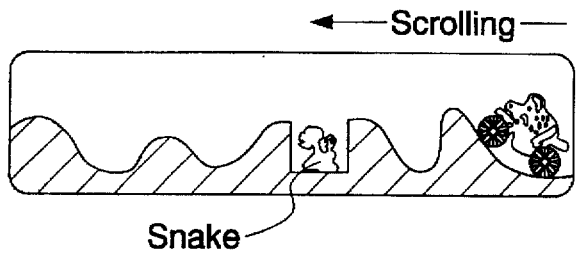
FIGS. 13A through 13C illustrate electronic display game play screens for the alternative embodiment of FIG. 7.
Figure 13B:
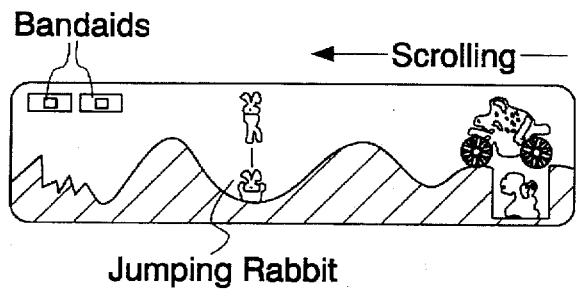
Figure 13C:
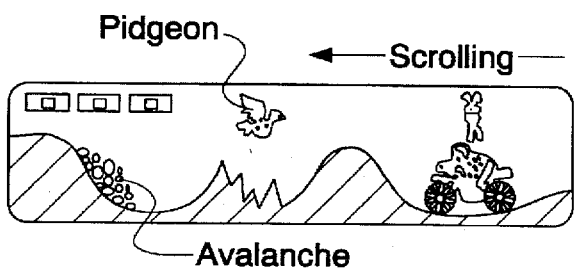

Game Summary and Gameplay:

MOTOBIKE is a FLIX STIX LCD game as illustrated in FIG. 7, wherein a motorcycle jumps over pits and obstacles in the road, as presented on the display. MOTOBIKE is a horizontal game having rotating switches at one end and a button on the other end. The LCD graphic for this game is illustrated in FIGS. 13A-13C.

Game Story:

You will control REX, a radical little MOTOCROSS maniac as he races across several different racing courses of action. The game will feature REX on his moto-bike on the one side of the screen, with the screen scrolling towards him. The game consists of a rotating switch on one side, and a button on the other side. The rotating switch will be like a THROTTLE, and will control the speed of the bike. When twisted forward, this THROTTLE will cause the bike to speed up (and have the screen scroll towards the bike faster). The button on the left side will be used for JUMPING over obstacles. The goal of the game will be to guide REX to the finish line of all courses (levels).

There are many obstacles that REX will need to avoid on this way to finish line. Obstacles will include PITS, BARRELS, EXPLODING BARRELS, and BOUNCING BOULDERS. REX will need to jump over these obstacles with the ramps placed along the race track. To jump over any object, REX will need to use the THROTTLE control on his bike to speed up and press the JUMP button to successfully make the jump. Each course (level) has a time limit. Whenever REX hits an obstacle, he will crash and lose valuable time. If REX does not reach the finish line in time on any course, the game is over. If REX reaches the finish line with time remaining, he will receive BONUS POINTS added to his score. REX will also receive points for successfully jumping over obstacles. There are some obstacles that will be very difficult to avoid. The exploding barrels look just like normal barrels, but will flash as REX approaches. If he does not time his jump correctly, these barrels will explode just as REX passes over them. The BOUNCING BOULDERS will bounce in such a way that REX will need to either slow down (twist THROTTLE switch back) or speed up (twist THROTTLE switch forward) to avoid them. The game features some sound effects for the motor-bike. For example, when the bike reaches full speed, there should be an engine sound.

Control Summary:

As with all FLEX STIX games, the controls are specific to the unit/game. The MOTO-CROSS unit is a horizontal unit. On one side of the unit is a TWIST KNOB/SWITCH which will control the speed of the bike, and a JUMP button will be featured on the side of the unit. When twisted forward, this knob will cause the bike to speed up, and when twisted back, the bike will slow down. (Speed of the bike will be shown by the speed at which the screen scroll towards the player, from right to left. The JUMP button will cause the bike to jump in the air, and will be used to jump over obstacles.

EXAMPLE 6

"POWER PUNCHIN"

Figure 14A:
FIG. 14 illustrates electronic display game play screens for the alternative embodiment of FIG. 8.
Figure 14B:
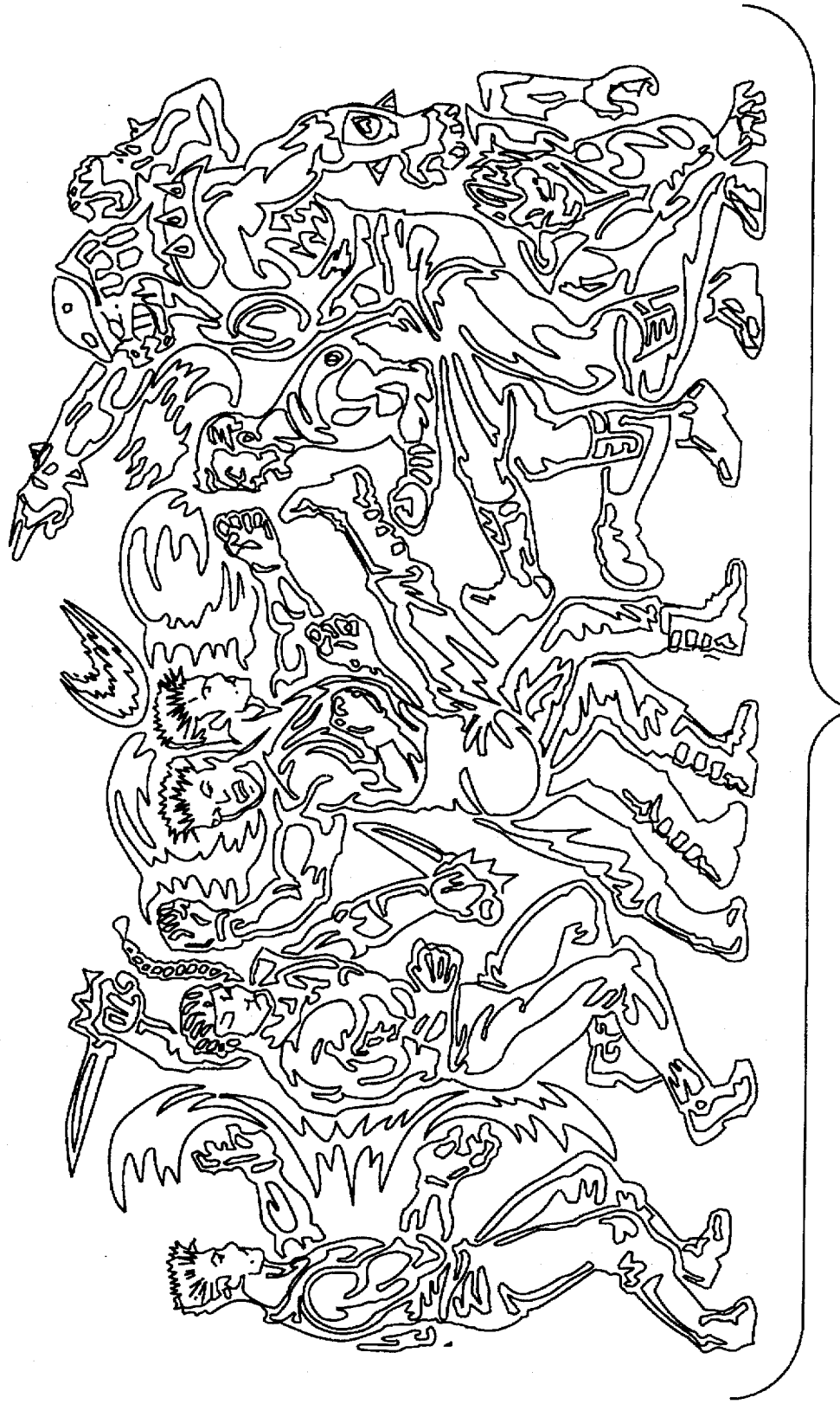

Game Summary and Gameplay:

POWER PUNCHIN is a FLIX STIX LCD game having a 4-way directional pad and ends which push inward, as illustrated in FIG. 8. POWER PUNCHIN is a fighting game. The LCD graphic for this game is illustrated in FIG. 14.

Game Story:

It is a "one-on-one" fighting game. The player 5 will play as a martial arts fighter competing in a combat tournament. The tournament will consist of three "Best of three round" fights against computer controlled opponents. Use punches, kicks, and special moves to defeat your opponents. Every time you hit your opponent with a kick/punch/special move, you deplete their energy meter. If their energy meter drops to zero, you win the round.

Each fighter will have an "energy meter", like in other fighting games. Every time a player is hit, their energy meter will drop a certain amount. When the meter reaches "empty", that fighter is knocked out, and the other fighter wins. You can knock an opponent out by kicking and punching, as well as using "special moves" to attack them. Your opponent (one of the other fighters) will also use punches, kicks, and special moves in order to win the fight. The winner of two out of three rounds advances to the next fight, against a new opponent. If you are able to defeat all three opponents, you win the game! If you lose two out of three rounds against any opponent, the game is over. The player will receive bonus points every time they successfully hit an opponent, and bonus points when they defeat an opponent. There will be a visual timekeeper on-screen as well. If both fighters are standing after the time has run out, the winner will be the player whose energy meter is more full.

Method of Switching Operations and Motion Control:

The game works in the following manner. It will consist of directional keys and a button on the end of the unit. The directional keys will control movement of the fighter (right/left/up/down), and the attack button, when pressed in, will be used for punching and kicking.

Other embodiments of the hand-held game devices in accordance with the present invention will be apparent to those skilled in the art from consideration of the specification and practice of the invention disclosed herein. It is intended therefore that the specification be considered as exemplary only with the true scope and spirit of the invention in being indicated by the following claims.

What is claimed is:

1. A hand-held electronic game device for being held by a player's hand comprising:
   a stick body;
   means for controlling at a first end of said stick body;
   an electronic display intermediate said stick body responsive to said control means.

2. The device in accordance with claim 1 wherein said controlling means comprises a member attached at said first end of said stick body manipulatable by the player's hand as a user interface providing input signals to the hand-held electronic game to control said electronic display.

3. A device in accordance with claim 2 wherein said control means comprise at least one of push buttons, pull switches, spring-loaded balls, flip switches, momentary switches, slide switches, twist knobs, mouse controls, pointer balls, lever arms.

4. A device in accordance with claim 3 further comprising means for controlling at a second end of said stick body comprising a member attached at said second end of said stick body manipulatable by the player's hand as a user interface providing input signals to the hand-held electronic game to control said electronic display.

5. A device in accordance with claim 4 wherein said control means at said second end of said stick body comprise at least one of push buttons, pull switches, spring-loaded balls, flip switches, momentary switches, slide switches, twist knobs, mouse controls, pointer balls, lever arms.

6. A hand-held electronic game device for being held by a player's hand comprising:

an elongated tubular body having an intermediate portion and first and second ends;

an electronic display located at the intermediate portion of said elongated tubular body;

a switch control at the first end of said elongated tubular body operable with the player's hand; and an electronic circuit responsive to said switch control for controlling said electronic display, the electronic circuit being housed within said elongated tubular body.

7. A device in accordance with claim 6 wherein said switch control at the first end of said elongated tubular body comprises a member attached to said elongated tubular body, manipulatable by the player's hand for controlling said electronic display.

8. A device in accordance with claim 7 wherein said switch control comprise at least one of push buttons, pull switches, spring-loaded balls, flip switches, momentary switches, slide switches, twist knobs, mouse controls, pointer balls, lever arms.

9. A device in accordance with claim 8 further comprising a second switch control at the second end of said elongated tubular body.

10. A device in accordance with claim 9 wherein said second switch control at the second end of said elongated tubular body comprises a second member manipulatable by the player's hand.

11. A device in accordance with claim 10 wherein said second member comprise at least one of push buttons, pull switches, spring-loaded balls, flip switches, momentary switches, slide switches, twist knobs, mouse controls, pointer balls, lever arms.

12. A device in accordance with claim 11 wherein the electronic game is operable by the player's hand holding the elongated tubular body in a vertical orientation.

13. A device in accordance with claim 12 wherein said second member is manipulatable by the player's hand holding said first end while pushing said second end against a surface exerting force thereby.

14. A device in accordance with claim 11 wherein the electronic game is operable by the player's hand holding the elongated tubular body in a horizontal fashion.

15. A device in accordance with claim 11 wherein the first and second ends of the elongated tubular body are each held in the player's hands.

16. An enclosure for housing a hand-held electronic game, the enclosure comprising:

an elongated body having two ends and a generally tubular intermediate portion;

a recessed opening defined along the intermediate portion of said elongated body; and a hand operable control member abutting one of the ends of said elongated body.

17. An enclosure in accordance with claim 16 further comprising a second hand operable control member abutting the other of the ends of said elongated body.

18. An enclosure in accordance with claim 17 wherein said hand operable control members provide a user interface for the hand-held electronic game.

* * * * *